(12) United States Patent
Xue et al.

(10) Patent No.: US 11,440,924 B2
(45) Date of Patent: Sep. 13, 2022

(54) METHOD FOR PREPARING BORATE ESTER ON BASIS OF TRICYCLOPENTADIENYL RARE EARTH METAL COMPLEX

(71) Applicant: SOOCHOW UNIVERSITY, Suzhou (CN)

(72) Inventors: Mingqiang Xue, Suzhou (CN); Dandan Yan, Suzhou (CN); Sufang Chen, Suzhou (CN); Qi Shen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 496 days.

(21) Appl. No.: 16/605,249

(22) PCT Filed: Apr. 15, 2017

(86) PCT No.: PCT/CN2017/080689
§ 371 (c)(1),
(2) Date: Oct. 15, 2019

(87) PCT Pub. No.: WO2018/188104
PCT Pub. Date: Oct. 18, 2018

(65) Prior Publication Data
US 2021/0139513 A1    May 13, 2021

(51) Int. Cl.
| C07F 5/04 | (2006.01) |
| B01J 31/22 | (2006.01) |
| B01J 31/26 | (2006.01) |

(52) U.S. Cl.
CPC ............. *C07F 5/04* (2013.01); *B01J 31/2265* (2013.01); *B01J 2231/344* (2013.01); *B01J 2531/36* (2013.01); *B01J 2531/37* (2013.01); *B01J 2531/38* (2013.01)

(58) Field of Classification Search
CPC .............. C07F 5/04; B01J 31/26; B01J 31/22
See application file for complete search history.

(56) References Cited

U.S. PATENT DOCUMENTS

| 3,334,079 A * | 8/1967 | Raich ...................... C08F 10/00 502/115 |
| 4,492,655 A * | 1/1985 | Gradeff .................... C07F 5/00 534/15 |
| 4,862,033 A * | 8/1989 | Migita ................... H05B 33/10 428/690 |
| 6,391,520 B1 * | 5/2002 | Nakano ................. G03F 7/0045 430/326 |
| 7,868,103 B2 * | 1/2011 | Shiba ...................... C08F 36/06 528/488 |
| 8,952,090 B2 * | 2/2015 | Luo ........................ B60C 1/0016 525/337 |
| 9,969,837 B2 * | 5/2018 | Duggal .................. C08G 18/18 |

FOREIGN PATENT DOCUMENTS

| CN | 101258173 A | 9/2008 | |
| CN | 102011098 A | 4/2011 | |
| CN | 106188119 A | 12/2016 | |
| CN | 106883255 A | 6/2017 | |
| CN | 106883256 A | 6/2017 | |
| WO | WO 2018/000400 A1 * | 1/2018 | ............... C07F 5/00 |
| WO | WO 2018/000401 A1 * | 1/2018 | ............... C07F 5/04 |
| WO | WO 2018/000402 A1 * | 1/2018 | ............... B01J 31/22 |

OTHER PUBLICATIONS

Rodrigues et al., "(t-BuC5H4)3Nd: A triscyclopentadienyl rare earth compound as non-classical isoprene polymerization pre-catalyst," Journal of Organometallic Chemistry 743 (Dec. 31, 2013) 139-146.

* cited by examiner

*Primary Examiner* — Rip A Lee
(74) *Attorney, Agent, or Firm* — SZDC Law P.C.

(57) ABSTRACT

Disclosed is a method for preparing a borate ester on the basis of a tricyclopentadienyl rare earth metal complex, the method comprising the following steps: uniformly stirring and mixing a catalyst, a borane and a carbonyl compound for reaction to prepare a borate ester, wherein the catalyst is a tricyclopentadienyl rare earth metal complex; and the molecular formula of the tricyclopentadienyl rare earth metal complex can be expressed as: $Ln(Cp)_3$, wherein Ln represents a rare metal selected from one of lanthanide elements. The preparation method has a higher catalytic activity, mild reaction conditions, a product that is easy to post-treat, a short reaction time, a low catalyst consumption amount, and a good range of applicable substrates, and can be used for industrial production.

9 Claims, No Drawings

METHOD FOR PREPARING BORATE ESTER ON BASIS OF TRICYCLOPENTADIENYL RARE EARTH METAL COMPLEX

This application is the National Stage Application of PCT/CN2017/080689, filed on Apr. 15, 2017, which is incorporated by reference for all purposes as if fully set forth herein.

TECHNICAL FIELD

This invention belongs to the field of organic synthesis, and particularly relates to a method for preparing borate ester on the basis of tricyclopentadienyl rare earth metal complex.

BACKGROUND ART

Borate esters are widely used not only as polymer additives, gasoline additives, sterilizers and flame retardants, but also as lubricant additives and automobile brake fluids. At the same time, boric acid or borate ester can be converted into many other functional groups. It is an important reagent in organic synthesis. As a chiral drug, the research is gradually deepening. Now bortezomib has been synthesized using chiral boric acid as a drug structure unit. It is the first approved treatment for multiple bone marrow cancer and lymphoma. Protease inhibitor drugs, so the application prospects of chiral boric acid or borate esters are very broad. The addition reaction of carbonyl compounds with borane is the most direct and atomically economical method for the synthesis of borate esters containing various substituents. However, studies have shown that borohydride reaction of some boranes (such as pinacol borane) is very difficult without catalyst, which may be due to the low Lewis acidity of such boranes. In the existing catalytic systems, the amount of catalyst is larger, the reaction time is longer, and the universality of substrates is lower.

The complexes formed by rare earth ions have unique physiological and chemical properties and remarkable magnetic properties under certain conditions. Importantly, the stability of rare earth complexes varies irregularly with radius, and the factors affecting the stability of complexes are not only ion radius, but also metal coordination number, ligand steric resistance, hydration degree and valence bond composition. Therefore, the interaction between rare earth ions and various ligands has changed, modified and enhanced their properties to a large extent. For example, when Europium complexes are doped in conductive polymer CN-PPP, the energy transfer efficiency of β-diketone-europium complexes of symmetric and asymmetric phenanthrene is only 0.053%, which is much lower than 1.1% that of β-diketone-europium complexes of symmetric biphenyl complexes.

Technical Problems

Problem Solution

Technical Solution

This invention is in order to supply a method for preparing borate ester on the basis of a tricyclopentadienyl rare earth metal complex, which preparation of borate ester from carbonyl compounds with pinacolborane catalyzed by tricyclopentadienyl rare earth metal complex. The preparation method has a higher catalytic activity, mild reaction conditions, a product that is easy to post-treat, a short reaction time, a low catalyst consumption amount, and a good range of applicable substrates, and can be used for industrial production.

In order to achieve the above purposes, the technical proposal adopted by the invention is:

A method for preparing borate ester on the basis of a tricyclopentadienyl rare earth metal complex, the method comprising the following steps: uniformly stirring and mixing catalyst, borane and carbonyl compounds for reaction to prepare borate ester, wherein the catalyst is a tricyclopentadienyl rare earth metal complex; wherein the chemical structural formula of the tricyclopentadienyl rare earth metal complex can be expressed as:

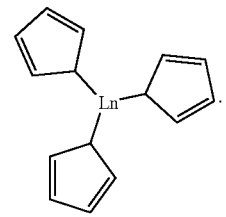

In the above, wherein the borane is pinacolborane; wherein the carbonyl compounds is ketone or aldehyde; wherein the ketone is aromatic ketone or aliphatic cyclic ketone; wherein the chemical structural formula of aromatic ketone is one of follows:

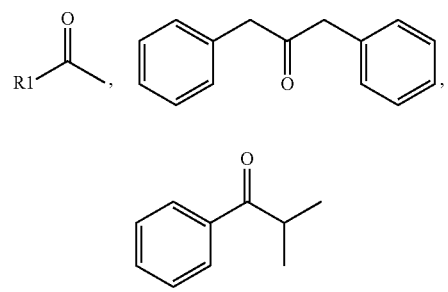

wherein R1 is phenyl, substituted-phenyl or heterocyclic aryl group;

wherein the chemical structural formula of aliphatic cyclic ketone can be one of follows:

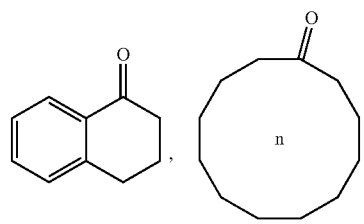

wherein n is 3-15;

wherein the chemical structural formula of aldehyde can be one of follows:

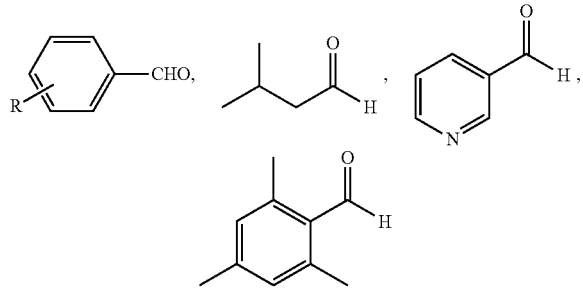

wherein R is selected from hydrogen, halogen, methyl or methoxy group.

In the present invention, wherein the dosage of tricyclopentadienyl rare earth metal complex is 0.01~1% of molar amount of carbonyl compounds; wherein the molar ratio of the borane and carbonyl compounds is 1-1.2:1, the reaction time between 30 min~1 h; the reaction temperature is room temperature.

In the present invention, wherein the reaction is carried out in organic solvents, preferably, in tetrahydrofuran.

In the present invention, when the reaction is over, subtracting pressure and detaching solvent of reaction solution, placing n-hexane into the residual liquid, and getting various substituted borate esters.

Moreover, the present invention is also disclosed application of tricyclopentadienyl rare earth metal complex as a catalyst of the reaction for pinacolborane and carbonyl compounds; wherein the chemical structural formula of the tricyclopentadienyl rare earth metal complex is:

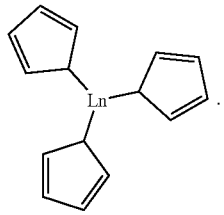

In the present invention, the molecular formula of the tricyclopentadienyl rare earth metal complex can be expressed as: $Ln(Cp)_3$, wherein Ln represents a rare metal selected from one lanthanide element of lanthanum, yttrium, neodymium, ytterbium and samarium.

In the present invention, wherein the borane is pinacolborane; wherein the carbonyl compounds is ketone or aldehyde; wherein the ketone is aromatic ketone or aliphatic cyclic ketone; wherein the chemical structural formula of aromatic ketone is one of follows:

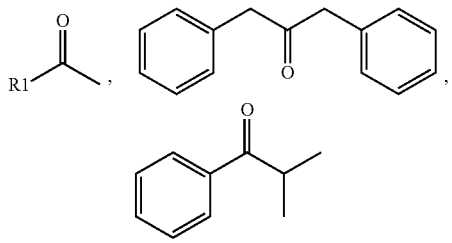

wherein R1 is phenyl, substituted-phenyl or heterocyclic aryl group;

wherein the chemical structural formula of aliphatic cyclic ketone can be one of follows:

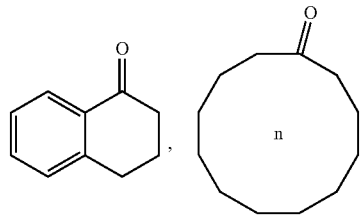

wherein n is 3~15;

wherein the chemical structural formula of aldehyde can be one of follows:

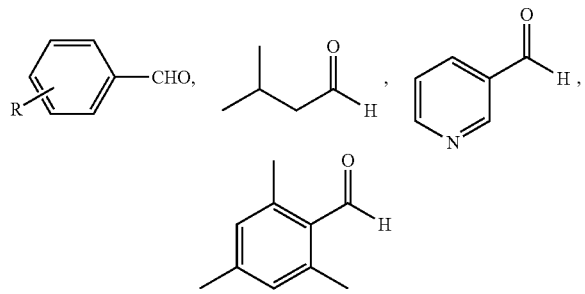

wherein R is selected from hydrogen, halogen, methyl or methoxy group.

In the present invention, wherein the dosage of tricyclopentadienyl rare earth metal complex is 0.01-1% of molar amount of carbonyl compounds; wherein the molar ratio of the borane and carbonyl compounds is 1-1.2:1, the reaction time between 30 min-1 h.

In the present invention, the tricyclopentadienyl rare earth metal complex can catalyze the borohydride reduction reaction of carbonyl compounds and pinacolborane to prepare a borate ester. Therefore, the invention requests to protect the application of tricyclopentadienyl rare earth metal complex as a catalyst for preparing a borate ester.

In the present invention, the reaction is at room temperature.

In the present invention, the technical proposal can be expressed as:

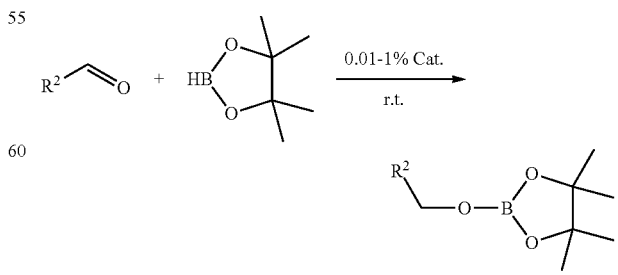

$R^2$ is the substituent group which got from above.

Beneficial Effects of the Invention

Due to the application of the above technical scheme, the present invention has the following advantages compared with the prior art:

In the present invention, consumption amount of the tricyclopentadienyl rare earth metal complex is 0.01~1 mol % of carbonyl compounds. The reaction speed is very fast and the product could reach more than 95% in 30 min at room temperature. Under the use of the tricyclopentadienyl rare earth metal complex the reaction is not only reduce the amount of catalyst, but also improves the yield, and mild reaction conditions, a product that is easy to post-treat, a short reaction time, which meets the requirements of atomic economic synthesis and green chemical reaction.

In the present invention, the very simple and readily attainable tricyclopentadienyl rare earth metal complex could serve as extremely efficient catalysts for the hydroboration toward carbonyl compounds for the first time.

The tricyclopentadienyl rare earth metal complex disclosed in the present invention has a good range of applicable substrates, dose for the carbonyl compounds with both electron-donating groups and electron with drawing groups could deliver excellent conversion rates for the target hydroboration products, and the reaction process is simple and controllable, the product is easy to post-treat, and can be used for industrial production, so that it provides more choices for the industrial synthesis of borate esters.

EMBODIMENT OF INVENTION

Embodiment of the Present Invention

Example 1: Benzaldehyde with Pinacolborane Compound into the Borate Ester Catalyzed by $Y(Cp)_3$ At the inert gas, loading the tetrahydrofuran solution of $Y(Cp)_3$ catalyst (1 mol %) to the reaction bottle which is treated by dehydration and deoxidation, then adding a pinacolborane (145.1 μL, 1 mmol) with pipette gun, and then adding a benzaldehyde (101.1 μL, 1 mmol) with pipette gun, after reacting for 30 minutes at room temperature, the stock solution is added $CDCl_3$. After calculation, conversion rate of 1H is 98%. $^1$H NMR analysis of the product is: $^1$H NMR (400 MHz, $CDCl_3$) δ 7.37-7.31 (m, 4 h), 7.27 (DT, j=6.1, 3.3 hz, 1H), 4.94 (s, 2 h), 1.27 (s, 12 h).

Example 2: Benzaldehyde with Pinacolborane Compound into the Borate Ester Catalyzed by $Y(Cp)_3$ At the inert gas, loading the tetrahydrofuran solution of $Y(Cp)_3$ catalyst (0.2 mol %) to the reaction bottle which is treated by dehydration and deoxidation, then adding a pinacolborane (145.1 μL, 1 mmol) with pipette gun, and then adding a benzaldehyde (101.1 μL, 1 mmol) with pipette gun, after reacting for 30 minutes at room temperature, the stock solution is added $CDCl_3$. After calculation, conversion rate of $^1$H is 97%. $^1$H NMR analysis of the product is the same with Examples 1.

Example 3: Benzaldehyde with Pinacolborane Compound into the Borate Ester Catalyzed by $Y(Cp)_3$ At the inert gas, loading the tetrahydrofuran solution of $Y(Cp)_3$ catalyst (0.1 mol %) to the reaction bottle which is treated by dehydration and deoxidation, then adding a pinacolborane (145.1 μL, 1 mmol) with pipette gun, and then adding a benzaldehyde (101.1 μL, 1 mmol) with pipette gun, after reacting for 30 minutes at room temperature, the stock solution is added $CDCl_3$. After calculation, conversion rate of $^1$H is 96%. $^1$H NMR analysis of the product is the same with Examples 1.

Example 4: Benzaldehyde with Pinacolborane Compound into the Borate Ester Catalyzed by $Y(Cp)_3$ At the inert gas, loading the tetrahydrofuran solution of $Y(Cp)_3$ catalyst (1 mol %) to the reaction bottle which is treated by dehydration and deoxidation, then adding a pinacolborane (145.1 μL, 1 mmol) with pipette gun, and then adding a benzaldehyde (101.1 μL, 1 mmol) with pipette gun, after reacting for 60 minutes at room temperature, the stock solution is added $CDCl_3$. After calculation, conversion rate of $^1$H is 99%. $^1$H NMR analysis of the product is the same with Examples 1.

Replace Y with Nd, Sm, Yb, conversion rate of $^1$H more than 99%, 99%, 99%.

Example 5: Benzaldehyde with Pinacolborane Compound into the Borate Ester Catalyzed by $La(Cp)_3$ At the inert gas, Loading the $La(Cp)_3$ catalyst (3.7 mg) to the reaction bottle which is treated by dehydration and deoxidation, then adding tetrahydrofuran (2 ml), then adding mixture (22 μL, 0.01 mol %) with pipette gun to another reaction bottle, then adding pinacolborane (174 μL, 1.2 mmol) with pipette gun, and then adding benzaldehyde (101.6 μL, 1 mmol) with pipette gun, after reacting for 1 h at room temperature, then pipette a drop into the nucleus tube and added $CDCl_3$ formulated solution. After calculation, conversion rate of $^1$H is 100%. $^1$H NMR analysis of the product is the same with Examples 1.

Example 6: Benzaldehyde with Pinacolborane Compound into the Borate Ester Catalyzed by $La(Cp)_3$ At the inert gas, loading the $La(Cp)_3$ catalyst (3.7 mg) to the reaction bottle which is treated by dehydration and deoxidation, then adding tetrahydrofuran (2 ml), then adding mixture (22 μL, 0.01 mol %) with pipette gun to another reaction bottle, then adding pinacolborane (174 μL, 1.2 mmol) with pipette gun, and then adding benzaldehyde (101.6 μL, 1 mmol) with pipette gun, after reacting for 30 min at room temperature, then pipette a drop into the nucleus tube and added $CDCl_3$ formulated solution. After calculation, conversion rate of $^1$H is more than 99%. $^1$H NMR analysis of the product is the same with Examples 1.

Example 7: Benzaldehyde with Pinacolborane Compound into the Borate Ester Catalyzed by $La(Cp)_3$ At the inert gas, Loading the $La(Cp)_3$ catalyst (5 mg) to the reaction bottle which is treated by dehydration and deoxidation, then adding tetrahydrofuran (3 ml), then adding mixture (24.4 μL, 0.01 mol %) with pipette gun to another reaction bottle, then adding pinacolborane (145.1 μL, 1 mmol) with pipette gun, and then adding benzaldehyde (101.6 μL, 1 mmol) with pipette gun, after reacting for 30 min at room temperature, then pipette a drop into the nucleus tube and added CDCl$_3$ formulated solution. After calculation, conversion rate of $^1$H is more than 99%. $^1$H NMR analysis of the product is the same with Examples 1.

Example 8: 4-Methylbenzaldehyde with Pinacolborane Compound into the Borate Ester Catalyzed by La(Cp)$_3$ At the inert gas, Loading the La(Cp)$_3$ catalyst (3.7 mg) to the reaction bottle which is treated by dehydration and deoxidation, then adding tetrahydrofuran (2 ml), then adding mixture (22 μL, 0.01 mol %) with pipette gun to another reaction bottle, then adding pinacolborane (174 μL, 1.2 mmol) with pipette gun, and then adding 4-methylbenzaldehyde (117.9 μL, 1 mmol) with pipette gun, after reacting for 1 h at room temperature, then pipette a drop into the nucleus tube and added CDCl$_3$ formulated solution. After calculation, conversion rate of $^1$H is 100%. $^1$H NMR analysis of the product: $^1$H NMR (400 MHz, CDCl$_3$) δ 7.37-7.31 (m, 4H), 7.27 (dt, J=6.1, 3.3 Hz, 1H), 4.94 (s, 2H), 1.27 (s, 12H).

Example 9: 2-Methylbenzaldehyde with Pinacolborane Compound into the Borate Ester Catalyzed by La(Cp)$_3$ At the inert gas, Loading the La(Cp)$_3$ catalyst (3.7 mg) to the reaction bottle which is treated by dehydration and deoxidation, then adding tetrahydrofuran (2 ml), then adding mixture (22 μL, 0.01 mol %) with pipette gun to another reaction bottle, then adding pinacolborane (174 μL, 1.2 mmol) with pipette gun, and then adding 2-methylbenzaldehyde (115.6 μL, 1 mmol) with pipette gun, after reacting for 1 h at room temperature, then pipette a drop into the nucleus tube and added CDCl$_3$ formulated solution. After calculation, conversion rate of $^1$H is 100%. $^1$H NMR analysis of the product: $^1$H NMR (400 MHz, CDCl$_3$) δ 7.37-7.31 (m, 4H), 7.27 (dt, J=6.1, 3.3 Hz, 1H), 4.94 (s, 2H), 1.27 (s, 12H).

Example 10: 2,4,6-Trimethylbenzaldehyde with Pinacolborane Compound into the Borate Ester Catalyzed by La(Cp)$_3$ At the inert gas, Loading the La(Cp)$_3$ catalyst (3.7 mg) to the reaction bottle which is treated by dehydration and deoxidation, then adding tetrahydrofuran (2 ml), then adding mixture (22 μL, 0.01 mol %) with pipette gun to another reaction bottle, then adding pinacolborane (174 μL, 1.2 mmol) with pipette gun, and then adding 2,4,6-trimethylbenzaldehyde (147.5 μL, 1 mmol) with pipette gun, after reacting for 1 h at room temperature, then pipette a drop into the nucleus tube and added CDCl$_3$ formulated solution. After calculation, conversion rate of $^1$H is 100%. $^1$H NMR analysis of the product: $^1$H NMR (400 MHz, CDCl$_3$) δ 7.37-7.31 (m, 4H), 7.27 (dt, J=6.1, 3.3 Hz, 1H), 4.94 (s, 2H), 1.27 (s, 12H).

Example 11: 2-Methoxybenzaldehyde with Pinacolborane Compound into the Borate Ester Catalyzed by La(Cp)$_3$ At the inert gas, Loading the La(Cp)$_3$ catalyst (3.7 mg) to the reaction bottle which is treated by dehydration and deoxidation, then adding tetrahydrofuran (2 ml), then adding mixture (22 μL, 0.01 mol %) with pipette gun to another reaction bottle, then adding pinacolborane (174 μL, 1.2 mmol) with pipette gun, and then adding 2-methoxybenzaldehyde (120.8 μL, 1 mmol) with pipette gun, after reacting for 1 h at room temperature, then pipette a drop into the nucleus tube and added CDCl$_3$ formulated solution. After calculation, conversion rate of $^1$H is 100%. $^1$H NMR analysis of the product: $^1$H NMR (400 MHz, CDCl$_3$) δ 7.41 (dd, J=7.5, 0.7 Hz, 1H), 7.23 (dd, J=7.8, 1.4 Hz, 1H), 6.95 (t, J=7.5 Hz, 1H), 6.84 (d, J=8.1 Hz, 1H), 4.98 (s, 2H), 3.81 (s, 3H), 1.34-1.21 (m, 12H).

Example 12: 4-Chlorobenzaldehyde with Pinacolborane Compound into the Borate Ester Catalyzed by La(Cp)$_3$ At the inert gas, Loading the La(Cp)$_3$ catalyst (3.5 mg) to the reaction bottle which is treated by dehydration and deoxidation, then adding tetrahydrofuran (3 ml), then adding mixture (24.4 μL, 0.01 mol %) with pipette gun to another reaction bottle, then adding pinacolborane (174 μL, 1.2 mmol) with pipette gun, and then adding 4-chlorobenzaldehyde (117.5 μL, 1 mmol) with pipette gun, after reacting for 1 h at room temperature, then pipette a drop into the nucleus tube and added CDCl$_3$ formulated solution. After calculation, conversion rate of $^1$H is 100%. $^1$H NMR analysis of the product: $^1$H NMR (400 MHz, CDCl$_3$) δ 7.36 (s, 1H), 7.26-7.18 (m, 3H), 4.89 (s, 2H), 1.27 (s, 12H).

Example 13: 4-Bromobenzaldehyde with Pinacolborane Compound into the Borate Ester Catalyzed by La(Cp)$_3$ At the inert gas, Loading the La(Cp)$_3$ catalyst (3.5 mg) to the reaction bottle which is treated by dehydration and deoxidation, then adding tetrahydrofuran (3 ml), then adding mixture (18.5 μL, 0.01 mol %) with pipette gun to another reaction bottle, then adding pinacolborane (132 μL, 0.91 mmol) with pipette gun, and then adding 4-bromobenzaldehyde (140.3 μL, 0.76 mmol) with pipette gun, after reacting for 1 h at room temperature, then pipette a drop into the nucleus tube and added CDCl$_3$ formulated solution. After calculation, conversion rate of $^1$H is 99%. $^1$H NMR analysis of the product: $^1$H NMR (400 MHz, CDCl$_3$) δ 7.36 (s, 1H), 7.26-7.18 (m, 3H), 4.89 (s, 2H), 1.27 (s, 12H).

Example 14: 2-Chlorobenzaldehyde with Pinacolborane Compound into the Borate Ester Catalyzed by La(Cp)$_3$ At the inert gas, Loading the La(Cp)$_3$ catalyst (3.5 mg) to the reaction bottle which is treated by dehydration and deoxidation, then adding tetrahydrofuran (3 ml), then adding mixture (18.5 μL, 0.01 mol %) with pipette gun to another reaction bottle, then adding pinacolborane (174 μL, 1.2 mmol) with pipette gun, and then adding 2-chlorobenzaldehyde (117.5 μL, 1 mmol) with pipette gun, after reacting for 1 h at room temperature, then pipette a drop into the nucleus tube and added CDCl$_3$ formulated solution. After calculation, conversion rate of $^1$H is 100%.

Example 15: Isovaleraldehyde with Pinacolborane Compound into the Borate Ester Catalyzed by La(Cp)$_3$ At the inert gas, Loading the La(Cp)$_3$ catalyst (3.5 mg) to the reaction bottle which is treated by dehydration and deoxidation, then adding tetrahydrofuran (3 ml), then adding mixture (18.5 μL, 0.01 mol %) with pipette gun to another reaction bottle, then adding pinacolborane (174 μL, 1.2 mmol) with pipette gun, and then adding isovaleraldehyde (1 mmol) with pipette gun, after reacting for 1 h at room temperature, then pipette a drop into the nucleus tube and added CDCl₃ formulated solution. After calculation, conversion rate of ¹H is more than 99%.

Example 16: 3-Pyridylaldehyde with Pinacolborane Compound into the Borate Ester Catalyzed by La(Cp)₃

At the inert gas, Loading the La(Cp)₃ catalyst (3.5 mg) to the reaction bottle which is treated by dehydration and deoxidation, then adding tetrahydrofuran (3 ml), then adding mixture (18.5 μL, 0.01 mol %) with pipette gun to another reaction bottle, then adding pinacolborane (174 μL, 1.2 mmol) with pipette gun, and then adding 3-pyridylaldehyde (1 mmol) with pipette gun, after reacting for 1 h at room temperature, then pipette a drop into the nucleus tube and added CDCl₃ formulated solution. After calculation, conversion rate of ¹H is more than 99%.

Example 17: Hypnone with Pinacolborane Compound into the Borate Ester Catalyzed by Y(Cp)₃

At the inert gas, Loading the Y(Cp)₃ catalyst (5.2 mg) to the reaction bottle which is treated by dehydration and deoxidation, then adding tetrahydrofuran (3 ml), then adding mixture (20.6 μL, 0.01 mol %) with pipette gun to another reaction bottle, then adding pinacolborane (174 μL, 1.2 mmol) with pipette gun, and then adding hypnone (116.7 μL, 1 mmol) with pipette gun, after reacting for 1 h at room temperature, then pipette a drop into the nucleus tube and added CDCl₃ formulated solution. After calculation, conversion rate of ¹H is 98%. ¹H NMR analysis of the product: ¹H NMR (400 MHz, CDCl₃) δ 7.40-7.22 (m, 5H), 1.51-1.47 (d, J=6.5 Hz, 3H), 1.24 (s, 6H), 1.21 (s, 6H).

Example 18: Hypnone with Pinacolborane Compound into the Borate Ester Catalyzed by Nd(Cp)₃

At the inert gas, Loading the Nd(Cp)₃ catalyst (5.3 mg) to the reaction bottle which is treated by dehydration and deoxidation, then adding tetrahydrofuran (3 ml), then adding mixture (23.3 μL, 0.01 mol %) with pipette gun to another reaction bottle, then adding pinacolborane (174 μL, 1.2 mmol) with pipette gun, and then adding hypnone (116.7 μL, 1 mmol) with pipette gun, after reacting for 60 minutes at room temperature, then pipette a drop into the nucleus tube and added CDCl₃ formulated solution. After calculation, conversion rate of ¹H is more than 99%. ¹H NMR analysis of the product is the same with Examples 17.

Example 19: Hypnone with Pinacolborane Compound into the Borate Ester Catalyzed by Sm(Cp)₃

At the inert gas, Loading the Sm(Cp)₃ catalyst (2.1 mg) to the reaction bottle which is treated by dehydration and deoxidation, then adding tetrahydrofuran (2 ml), then adding mixture (39.8 μL, 0.01 mol %) with pipette gun to another reaction bottle, then adding pinacolborane (174 μL, 1.2 mmol) with pipette gun, and then adding hypnone (116.7 μL, 1 mmol) with pipette gun, after reacting for 1 h at room temperature, then pipette a drop into the nucleus tube and added CDCl₃ formulated solution. After calculation, conversion rate of ¹H is 99%. ¹H NMR analysis of the product is the same with Examples 17.

Example 20: Hypnone with Pinacolborane Compound into the Borate Ester Catalyzed by La(Cp)₃

At the inert gas, Loading the La(Cp)₃ catalyst (2.8 mg) to the reaction bottle which is treated by dehydration and deoxidation, then adding tetrahydrofuran (2 ml), then adding mixture (29 μL, 0.01 mol %) with pipette gun to another reaction bottle, then adding pinacolborane (174 μL, 1.2 mmol) with pipette gun, and then adding hypnone (116.7 μL, 1 mmol) with pipette gun, after reacting for 1 h at room temperature, then pipette a drop into the nucleus tube and added CDCl₃ formulated solution. After calculation, conversion rate of ¹H is more than 99%. ¹H NMR analysis of the product is the same with Examples 17.

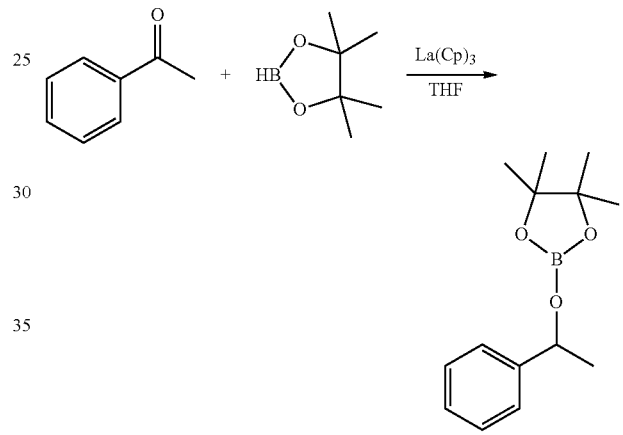

Example 21: Hypnone with Pinacolborane Compound into the Borate Ester Catalyzed by Yb(Cp)₃

At the inert gas, Loading the Yb(Cp)₃ catalyst (4.3 mg) to the reaction bottle which is treated by dehydration and deoxidation, then adding tetrahydrofuran (3 ml), then adding mixture (30.7 μL, 0.01 mol %) with pipette gun to another reaction bottle, then adding pinacolborane (174 μL, 1.2 mmol) with pipette gun, and then adding hypnone (116.7 μL, 1 mmol) with pipette gun, after reacting for 1 h at room temperature, then pipette a drop into the nucleus tube and added CDCl₃ formulated solution. After calculation, conversion rate of ¹H is 97%. ¹H NMR analysis of the product is the same with Examples 17.

Example 22: Isobutyrophenone with Pinacolborane Compound into the Borate Ester Catalyzed by La(Cp)₃

At the inert gas, Loading the La(Cp)₃ catalyst (4.8 mg) to the reaction bottle which is treated by dehydration and deoxidation, then adding tetrahydrofuran (4 ml), then adding mixture (33.8 μL, 0.01 mol %) with pipette gun to another reaction bottle, then adding pinacolborane (174 μL, 1.2 mmol) with pipette gun, and then adding isobutyrophenone (150 μL, 1 mmol) with pipette gun, after reacting for 1 h at room temperature, then pipette a drop into the nucleus tube and added CDCl$_3$ formulated solution. After calculation, conversion rate of $^1$H is 99%. $^1$H NMR analysis of the product: $^1$H NMR (400 MHz, CDCl$_3$) δ 7.34-7.26 (m, 4H), 7.25-7.19 (m, 1H), 4.81 (d, J=6.2 Hz, 1H), 1.96 (dq, J=13.4, 6.7 Hz, 1H), 1.21 (s, 6H), 1.17 (s, 6H), 0.90 (d, J=6.7 Hz, 3H), 0.83 (d, J=6.8 Hz, 3H).

Example 23: 4-Methoxyacetophenone with Pinacolborane Compound into the Borate Ester Catalyzed by La(Cp)$_3$ At the inert gas, Loading the La(Cp)$_3$ catalyst (4.8 mg) to the reaction bottle which is treated by dehydration and deoxidation, then adding tetrahydrofuran (4 ml), then adding mixture (37.1 μL, 0.01 mol %) with pipette gun to another reaction bottle, then adding pinacolborane (190.8 μL, 1.3 mmol) with pipette gun, and then adding 4-methoxyacetophenone (164.6 mg, 1.1 mmol) with pipette gun, after reacting for 1 h at room temperature, then pipette a drop into the nucleus tube and added CDCl$_3$ formulated solution. After calculation, conversion rate of $^1$H is 100%. $^1$H NMR analysis of the product: $^1$H NMR (400 MHz, CDCl$_3$) δ 7.38-7.17 (m, 2H), 6.94-6.68 (m, 2H), 5.20 (q, J=6.4 Hz, 1H), 3.79 (s, 3H), 1.47 (d, J=6.4 Hz, 3H), 1.24 (s, 6H), 1.22 (s, 6H).

Example 24: 4-Fluoroacetophenone with Pinacolborane Compound into the Borate Ester Catalyzed by La(Cp)$_3$ At the inert gas, Loading the La(Cp)$_3$ catalyst (7 mg) to the reaction bottle which is treated by dehydration and deoxidation, then adding tetrahydrofuran (5 ml), then adding mixture (29 μL, 0.01 mol %) with pipette gun to another reaction bottle, then adding pinacolborane (174 μL, 1.2 mmol) with pipette gun, and then adding 4-fluoroacetophenone (120.9 μL, 1 mmol) with pipette gun, after reacting for 1 h at room temperature, then pipette a drop into the nucleus tube and added CDCl$_3$ formulated solution. After calculation, conversion rate of $^1$H is 99%. $^1$H NMR analysis of the product: $^1$H NMR (400 MHz, CDCl$_3$) δ 7.38-7.29 (m, 2H), 7.05-6.94 (m, 2H), 5.21 (q, J=6.4 Hz, 1H), 1.47 (d, J=6.4 Hz, 3H), 1.24 (s, 6H), 1.21 (s, 6H).

Example 25: 4-Methylacetophenone with Pinacolborane Compound into the Borate Ester Catalyzed by La(Cp)$_3$ At the inert gas, Loading the La(Cp)$_3$ catalyst (7 mg) to the reaction bottle which is treated by dehydration and deoxidation, then adding tetrahydrofuran (5 ml), then adding mixture (29 μL, 0.01 mol %) with pipette gun to another reaction bottle, then adding pinacolborane (174 μL, 1.2 mmol) with pipette gun, and then adding 4-methylacetophenone (133.5 μL, 1 mmol) with pipette gun, after reacting for 1 h at room temperature, then pipette a drop into the nucleus tube and added CDCl$_3$ formulated solution. After calculation, conversion rate of $^1$H is more than 99%. $^1$H NMR analysis of the product: $^1$H NMR (400 MHz, CDCl$_3$) δ 7.31-7.25 (m, 2H), 7.16 (t, J=7.4 Hz, 2H), 5.24 (q, J=6.4 Hz, 1H), 2.35 (s, 3H), 1.27 (s, 6H), 1.24 (s, 6H).

Example 26: 1-Tetralone with Pinacolborane Compound into the Borate Ester Catalyzed by La(Cp)$_3$ At the inert gas, Loading the La(Cp)$_3$ catalyst (7 mg) to the reaction bottle which is treated by dehydration and deoxidation, then adding tetrahydrofuran (5 ml), then adding mixture (29 μL, 0.01 mol %) with pipette gun to another reaction bottle, then adding pinacolborane (174 μL, 1.2 mmol) with pipette gun, and then adding 1-tetralone (132.8 μL, 1 mmol) with pipette gun, after reacting for 1 h at room temperature, then pipette a drop into the nucleus tube and added CDCl$_3$ formulated solution. After calculation, conversion rate of $^1$H is more than 99%. $^1$H NMR analysis of the product: $^1$H NMR (400 MHz, CDCl$_3$) δ 7.43-7.35 (m, 1H), 7.19-7.13 (m, 2H), 7.08 (m, 4.9 Hz, 1H), 2.94-2.58 (m, 2H), 2.14-1.99 (m, 1H), 2.00-1.90 (m, 2H), 1.82-1.67 (m, 1H), 1.31 (s, 6H), 1.29 (s, 6H).

Example 27: 2-Methylacetophenone with Pinacolborane Compound into the Borate Ester Catalyzed by La(Cp)$_3$ At the inert gas, Loading the La(Cp)$_3$ catalyst (3.9 mg) to the reaction bottle which is treated by dehydration and deoxidation, then adding tetrahydrofuran (9 ml), then adding mixture (31.3 μL, 0.01 mol %) with pipette gun to another reaction bottle, then adding pinacolborane (174 μL, 1.2 mmol) with pipette gun, and then adding 2-methylacetophenone (130.8 μL, 1 mmol) with pipette gun, after reacting for 1 h at room temperature, then pipette a drop into the nucleus tube and added CDCl$_3$ formulated solution. After calculation, conversion rate of $^1$H is 99%. $^1$H NMR analysis of the product: $^1$H NMR (400 MHz, CDCl$_3$) δ 7.55 (m, 1H), 7.33-7.08 (m, 3H), 5.45 (q, J=6.4 Hz, 1H), 1.48 (d, J=6.4 Hz, 3H), 1.26 (s, 6H), 1.22 (s, 6H).

Example 28: 2,4,6-Trimethylacetophenone with Pinacolborane Compound into the Borate Ester Catalyzed by La(Cp)$_3$ At the inert gas, Loading the La(Cp)$_3$ catalyst (3.9 mg) to the reaction bottle which is treated by dehydration and deoxidation, then adding tetrahydrofuran (3 ml), then adding mixture (31.3 μL, 0.01 mol %) with pipette gun to another reaction bottle, then adding pinacolborane (174 μL, 1.2 mmol) with pipette gun, and then adding 2,4,6-trimethylacetophenone (166.4 μL, 1 mmol) with pipette gun, after reacting for 1 h at room temperature, then pipette a drop into the nucleus tube and added CDCl$_3$ formulated solution. After calculation, conversion rate of $^1$H is 99%. $^1$H NMR analysis of the product: $^1$H NMR (400 MHz, CDCl$_3$) δ 6.79 (s, 2H), 5.65 (q, J=6.8 Hz, 1H), 2.41 (s, 6H), 2.24 (s, 3H), 1.52 (d, J=6.8 Hz, 3H), 1.21 (s, 6H), 1.17 (s, 6H).

Example 29: 4-Bromoacetophenone with Pinacolborane Compound into the Borate Ester Catalyzed by La(Cp)$_3$ At the inert gas, Loading the La(Cp)$_3$ catalyst (3.9 mg) to the reaction bottle which is treated by dehydration and deoxidation, then adding tetrahydrofuran (3 ml), then adding mixture (38 μL, 0.01 mol %) with pipette gun to another reaction bottle, then adding pinacolborane (211.5 μL, 1.4 mmol) with pipette gun, and then adding 4-bromoacetophenone (241.8 mg, 1.2 mmol) with pipette gun, after reacting for 1 h at room temperature, then pipette a drop into the nucleus tube and added CDCl$_3$ formulated solution. After calculation, conversion rate of $^1$H is 98%. $^1$H NMR analysis of the product: $^1$H NMR (400 MHz, CDCl$_3$) δ 7.41 (m, 2H), 7.21 (m, 2H), 5.16 (q, J=6.4 Hz, 1H), 1.42 (d, J=6.5 Hz, 3H), 1.20 (s, 6H), 1.18 (s, 6H).

Example 30: 4-Nitroacetophenone with Pinacolborane Compound into the Borate Ester Catalyzed by La(Cp)₃

At the inert gas, Loading the La(Cp)₃ catalyst (3.9 mg) to the reaction bottle which is treated by dehydration and deoxidation, then adding tetrahydrofuran (3 ml), then adding mixture (31.8 μL, 0.01 mol %) with pipette gun to another reaction bottle, then adding pinacolborane (177 μL, 1.2 mmol) with pipette gun, and then adding 4-nitroacetophenone (167.9 mg, 1 mmol) with pipette gun, after reacting for 2 h at room temperature, then pipette a drop into the nucleus tube and added CDCl₃ formulated solution. After calculation, conversion rate of $^1$H is 98%. $^1$H NMR analysis of the product: $^1$H NMR (400 MHz, CDCl₃) δ 8.16-8.08 (m, 2H), 7.47 (m, 2H), 5.26 (q, J=6.5 Hz, 1H), 1.44 (d, J=6.5 Hz, 3H), 1.19 (s, 6H), 1.16 (s, 6H).

Example 31: 1-(2-Thienyl) Acetone with Pinacolborane Compound into the Borate Ester Catalyzed by La(Cp)₃

At the inert gas, Loading the La(Cp)₃ catalyst (18.5 mg) to the reaction bottle which is treated by dehydration and deoxidation, then adding tetrahydrofuran (1.6 ml), then adding mixture (353 μL, 1 mol %) with pipette gun to another reaction bottle, then adding pinacolborane (174.1 μL, 1.2 mmol) with pipette gun, and then adding 1-(2-thienyl) acetone (108 μL, 1 mmol) with pipette gun, after reacting for 1 h at room temperature, then pipette a drop into the nucleus tube and added CDCl₃ formulated solution. After calculation, conversion rate of $^1$H is 99%. $^1$H NMR analysis of the product: $^1$H NMR (400 MHz, CDCl₃) δ 7.21-7.19 (m, 1H), 6.97-6.92 (m, 2H), 5.48 (q, J=6.4 Hz, 1H), 1.60 (d, J=6.4 Hz, 3H), 1.25 (d, J=4.9 Hz, 12H).

Example 32: Cyclododecanone with Pinacolborane Compound into the Borate Ester Catalyzed by La(Cp)₃

At the inert gas, Loading the La(Cp)₃ catalyst (18.5 mg) to the reaction bottle which is treated by dehydration and deoxidation, then adding tetrahydrofuran (1.6 ml), then adding mixture (340.8 μL, 1 mol %) with pipette gun to another reaction bottle, then adding pinacolborane (168.8 μL, 1.16 mmol) with pipette gun, and then adding cyclododecanone (168.8 mg, 0.97 mmol) with pipette gun, after reacting for 1 h at room temperature, then pipette a drop into the nucleus tube and added CDCl₃ formulated solution. After calculation, conversion rate of $^1$H is 100%, and conversion rate of $^1$H is 99% under 0.01 mol % with catalyst. $^1$H NMR analysis of the product: $^1$H NMR (400 MHz, CDCl₃) δ 4.11 (dt, J=31.5, 15.5 Hz, 1H), 1.66-1.53 (m, 2H), 1.32 (m, 22H), 1.17 (s, 12H).

Example 33: 1,3-Diphenylacetone with Pinacolborane Compound into the Borate Ester Catalyzed by La(Cp)₃

At the inert gas, Loading the La(Cp)₃ catalyst (18.5 mg) to the reaction bottle which is treated by dehydration and deoxidation, then adding tetrahydrofuran (1.6 ml), then adding mixture (286 μL, 1 mol %) with pipette gun to another reaction bottle, then adding pinacolborane (142.2 μL, 0.98 mmol) with pipette gun, and then adding 1,3-diphenylacetone (171.7 mg, 0.82 mmol) with pipette gun, after reacting for 1 h at room temperature, then pipette a drop into the nucleus tube and added CDCl₃ formulated solution. After calculation, conversion rate of $^1$H is 100%, and conversion rate of $^1$H is 99% under 0.01 mol % with catalyst. $^1$H NMR analysis of the product: $^1$H NMR (400 MHz, CDCl₃) δ 7.26-7.12 (m, 10H), 4.42 (dt, J=8.7, 4.5 Hz, 1H), 2.78 (m, 4H), 0.90 (s, 12H).

The invention claimed is:

1. A method for preparing a borate ester in the presence of a tricyclopentadienyl rare earth metal complex, the method comprising the following steps:
uniformly stirring and mixing a catalyst, a borane and a carbonyl compound in a reaction to prepare the borate ester, wherein the catalyst is a tricyclopentadienyl rare earth metal complex; wherein the carbonyl compound is a ketone or an aldehyde; wherein the chemical formula of the tricyclopentadienyl rare earth metal complex is expressed as:

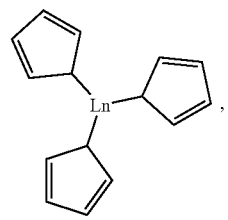

wherein Ln represents a rare earth metal.

2. The method according to claim 1, wherein the borane is pinacolborane; wherein the ketone is an aromatic ketone or an aliphatic cyclic ketone; wherein the chemical formula of the aromatic ketone is represented by one of the following:

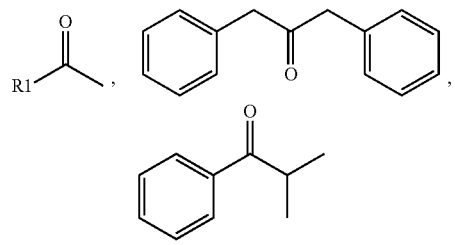

wherein R1 is phenyl, substituted-phenyl or heterocyclic aryl group;
wherein the chemical formula of the aliphatic cyclic ketone is represented by one of the following:

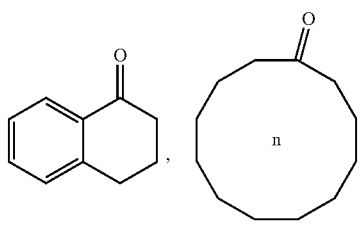

wherein n is 3-15;
wherein the chemical structural formula of aldehyde is represented by one of the following:

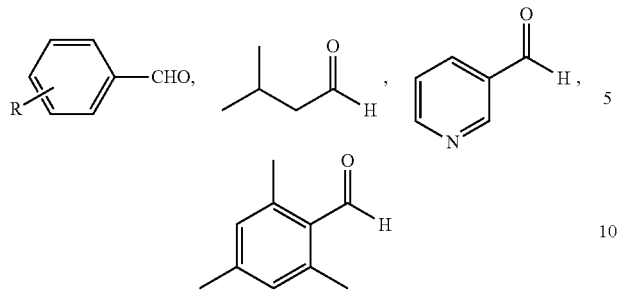

wherein R is hydrogen, halogen, methyl or methoxy group.

3. The method according to claim 1, wherein an amount of the tricyclopentadienyl rare earth metal complex is 0.01-1% of a molar amount of carbonyl compound; wherein a molar ratio of the borane and the carbonyl compound is 1-1.2:1.

4. The method according to claim 1, wherein the reaction is carried out in an organic solvent; wherein a reaction time is between 30 min and 1 h; wherein the reaction is carried out at room temperature.

5. The method according to claim 1, further comprising: when the reaction is over, reducing pressure and removing solvent of reaction solution, adding n-hexane into a residual liquid, and obtaining various substituted borate esters.

6. A method comprising applying a tricyclopentadienyl rare earth metal complex as a catalyst for a reaction of a carbonyl compound with pinacolborane; wherein the chemical formula of the tricyclopentadienyl rare earth metal complex is:

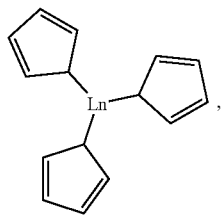

wherein Ln represents a rare earth metal.

7. The method according to claim 6, wherein Ln is a rare-earth metal selected from the group consisting of lanthanum, yttrium, neodymium, ytterbium and samarium; wherein the borane is pinacolborane; wherein the carbonyl compound is a ketone or an aldehyde; wherein the ketone is an aromatic ketone or an aliphatic cyclic ketone; wherein the chemical formula of the aromatic ketone is represented by:

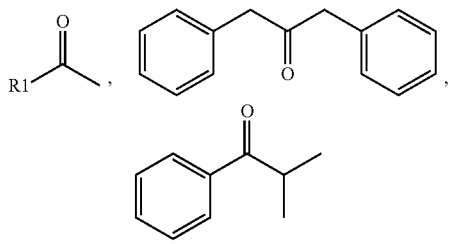

wherein R1 is phenyl, substituted-phenyl or heterocyclic aryl group;

wherein the chemical formula of the aliphatic cyclic ketone is represented by one of the following:

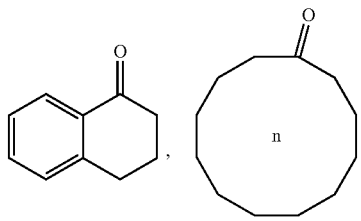

wherein n is 3-15;

wherein the chemical formula of the aldehyde is represented by one of the following:

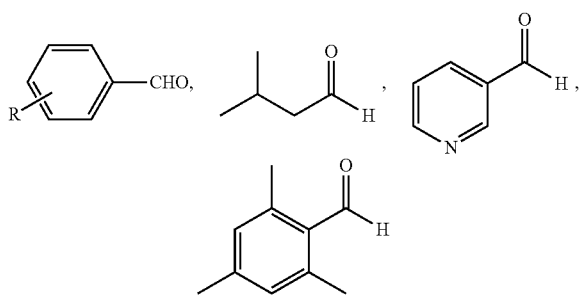

wherein R is hydrogen, halogen, methyl or methoxy group.

8. The method according to claim 6, wherein of the tricyclopentadienyl rare earth metal complex is 0.01-1% of a molar amount of the carbonyl compound; wherein a molar ratio of the pinacolborane and the carbonyl compound is 1-1.2:1; wherein a reaction time is between 30 min and 1 h; wherein the reaction is carried out at room temperature.

9. A method for reaction of a borane with an aldehyde, the method comprising the following steps:

uniformly stirring and mixing the borane and the aldehyde in the presence of a catalyst, completely reacting the borane with the aldehyde at room temperature for 30 min to 1 h; wherein the catalyst is a tricyclopentadienyl rare earth metal complex having a chemical formula represented by:

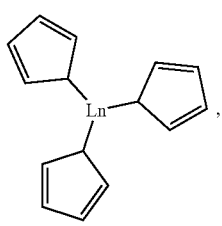

wherein Ln represents a rare earth metal.

* * * * *